Nov. 18, 1958     P. L. BROWN     2,860,515
SOIL MOISTURE PROBE
Filed March 30, 1956
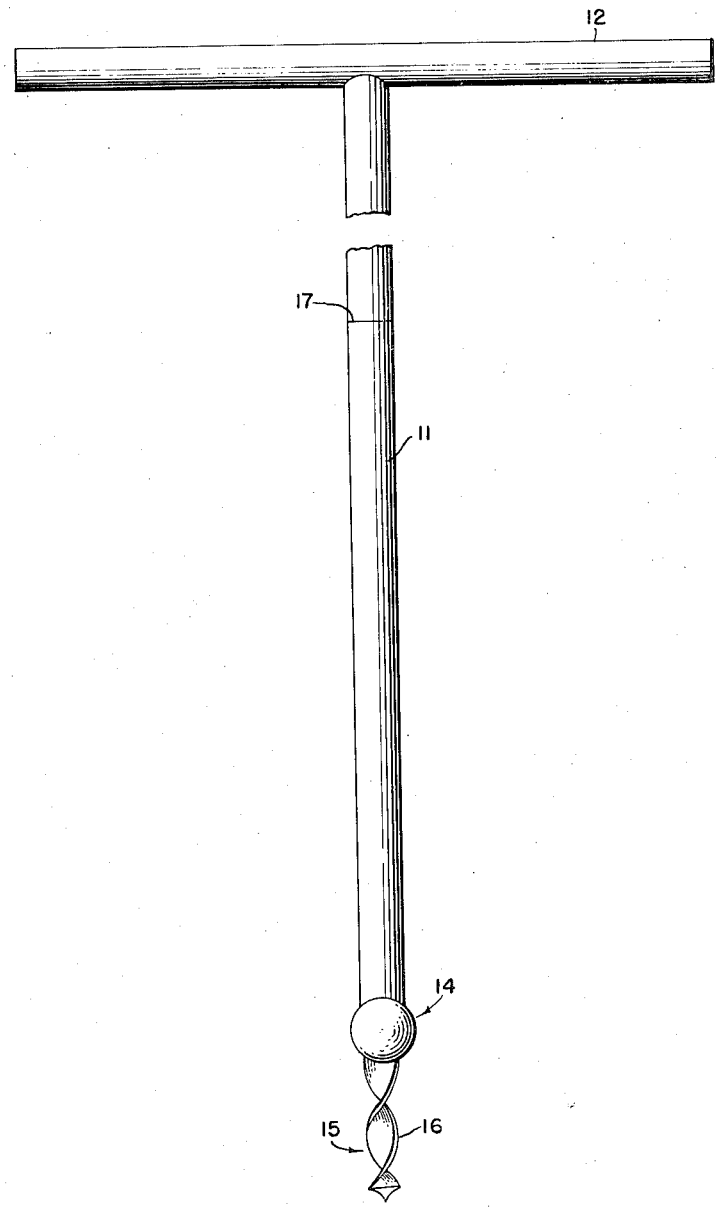
INVENTOR
PAUL L. BROWN
BY *William Bier*
*a. a. Seegrist* ATTORNEYS United States Patent Office 2,860,515
Patented Nov. 18, 1958

2,860,515

SOIL MOISTURE PROBE

Paul L. Brown, Hays, Kans.

Application March 30, 1956, Serial No. 575,296

1 Claim. (Cl. 73—425)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a soil moisture probe for determining soil moisture depth quickly and easily and has as its object the provision of such a probe. Since the depth of wet soil is related to the amount of moisture available to a crop, a knowledge of such moisture depth is desirable and/or necessary, as for example, to serve as a basis on which to make nitrogen fertilizer recommendations, on which to make wheat yield estimates at wheat sowing time, and for predicting grain sorghum yields. Optimum planting rates also appear to depend on the amount of moisture of the soil.

In the accompanying drawing, the figure depicted is a side view of the soil moisture probe of the invention.

Referring to the drawing, the probe is provided with a rod 11, preferably about ½ inch in diameter, about 3 to 4 feet long, and constructed of cold rolled steel. The rod has a handle 12 at its upper end and a spherical part fixed to its lower end extending laterally beyond the rod, this spherical part being, for example, a steel ball 14, preferably of ⅝ inch diameter, which is integrally fixed, as by welding, to the lower end of the rod. A bit 15 having spirals 16, and preferably about ½ inch in diameter and about 1½ inches long, is integrally fixed to the ball 14, as by welding, extends below the ball, and is aligned with rod 11. The rod is also graduated at spaced intervals, e. g. foot marks 17, to show soil moisture depth measurements.

In operation, the probe is normally pushed into the moist soil by applying downward pressure, as, for example, the user's weight, to the handle without turning it, until it reaches the desired depth. As the probe enters the soil a vertical hole corresponding to a diameter slightly smaller than the diameter of the ball 14 is formed, the soil accumulating on the bit 15 and spirals 16 being a mixture of the soil layers through which the probe has penetrated. To obtain a representative sample from immediately below the depth of penetration, that is, immediately below the point at which the insertion of the probe is stopped, the probe handle is turned, preferably 2 or 3 times, while applying pressure to the handle which forces the spirals into the soil a short distance immediately below the point at which the original penetration of the probe was stopped, at the same time expels the mixed soil accumulated on the spirals of the bit, and then picks up a desired sample at this new slightly lower level. As the probe is withdrawn, always by being pulled directly out of the soil and never by reverse rotation, the soil on the spirals will be a representative sample from just below the depth at which the probe was originally stopped.

The ball 14 serves two purposes during the withdrawal. First, the soil sample, acquired and held on the spirals, is protected from contacting the walls of the vertical hole and thus avoids being shaken loose from the spirals. Since the spirals do not contact the walls of the vertical hole, the sample is protected from upper-soil contamination. Secondly, the ball is the only point of contact between the walls of the vertical hole and the probe and, since the ball has a polished spherical surface, friction is reduced to a minimum and the probe is withdrawn from the soil with minimum effort.

The spherical shape of the ball functions to facilitate insertion and withdrawal of the probe because moist soil exhibits some elasticity and tends to return to its original position. It is for this reason that the vertical hole, formed by the probe being pushed into the soil, has a smaller diameter than the ball itself. On pulling the probe out of the soil, the soil is again pushed out by the ball. As is apparent the soil flows around the ball with a minimum of friction thereby facilitating pushing the probe in, and pulling it out, of the ground.

What is claimed is:

A soil moisture probe comprising a rod having a handle fixed to its upper end and a spherical part fixed to its lower end extending laterally beyond the rod, and a bit, having spirals, fixed to and extending below the said spherical part in alignment with the said rod, whereupon as the bit is placed against moist ground and downward pressure applied to the handle without turning it, the probe enters and passes downward into the moist soil until it reaches a desired depth where it is stopped, and when the handle is thereafter turned while applying pressure, the spirals are forced into the soil a short distance immediately below the depth at which the probe had been stopped, and a representative sample of the soil at this new slightly lower level is acquired and held by the spirals, the probe containing the sample being thereafter pulled out of the ground without turning it and being facilitated thereby by the said spherical part.

References Cited in the file of this patent

UNITED STATES PATENTS 651,607    Lovering _____ June 12, 1900